US010117255B2

(12) United States Patent
Anjum et al.

(10) Patent No.: US 10,117,255 B2
(45) Date of Patent: Oct. 30, 2018

(54) NEIGHBORING CELL LOAD INFORMATION (71) Applicant: Nokia Technologies Oy, Espoo (FI)

(72) Inventors: Omer Anjum, Espoo (FI); Petteri Lunden, Espoo (FI); Mikko Uusitalo, Helsinki (FI); Carl Wijting, Espoo (FI)

(73) Assignee: Nokia Technologies Oy, Espoo (FI)

( * ) Notice: Subject to any disclaimer, the term of this patent is extended or adjusted under 35 U.S.C. 154(b) by 57 days.

(21) Appl. No.: 15/523,517

(22) PCT Filed: Nov. 12, 2014

(86) PCT No.: PCT/IB2014/065996
§ 371 (c)(1),
(2) Date: May 1, 2017

(87) PCT Pub. No.: WO2016/075515
PCT Pub. Date: May 19, 2016

(65) Prior Publication Data
US 2017/0318495 A1 Nov. 2, 2017

(51) Int. Cl.
H04W 72/04 (2009.01)
H04L 1/00 (2006.01)
(Continued)

(52) U.S. Cl.
CPC .......... *H04W 72/0486* (2013.01); *H04L 1/00* (2013.01); *H04W 16/08* (2013.01); *H04W 28/02* (2013.01);
(Continued)

(58) Field of Classification Search
CPC ......... H04W 28/0289; H04W 72/0486; H04W 52/343; H04W 28/02; H04W 16/08;
(Continued)

(56) References Cited

U.S. PATENT DOCUMENTS

2011/0312281 A1* 12/2011 Xiao ..................... H04W 24/10
455/67.11
2012/0182909 A1* 7/2012 Yamamoto .......... H04W 56/002
370/281
(Continued)

FOREIGN PATENT DOCUMENTS

EP  2512175 A1  10/2012
EP  2688348 A1  1/2014
(Continued)

OTHER PUBLICATIONS

"3rd Generation Partnership Project; Technical Specification Group Radio Access Network; Evolved Universal Terrestrial Radio Access Network (E-UTRAN); X2 application protocol (X2AP) (Release 9)", 3GPP TS 36.423, V9.6.0, Mar. 2011, pp. 1-121.
(Continued)

*Primary Examiner* — Hashim S Bhatti
(74) *Attorney, Agent, or Firm* — Nokia Technologies Oy (57) ABSTRACT A method including determining first information of a base station in regard to an area of shared coverage with a neighboring base station; and transmitting the determined first information from the base station. A method including receiving first information by a base station with regard to an area of shared coverage with a neighboring base station; determining, based at least partially upon the received first information.

17 Claims, 3 Drawing Sheets (51) Int. Cl.
*H04W 16/08* (2009.01)
*H04W 28/02* (2009.01)
*H04W 52/34* (2009.01)
*H04J 11/00* (2006.01)
*H04W 52/24* (2009.01)
*H04L 5/00* (2006.01)
*H04W 24/02* (2009.01)

(52) U.S. Cl.
CPC ..... *H04W 28/0289* (2013.01); *H04W 52/343* (2013.01); *H04J 11/005* (2013.01); *H04L 5/0073* (2013.01); *H04W 24/02* (2013.01); *H04W 52/243* (2013.01)

(58) Field of Classification Search
CPC ...... H04W 24/02; H04W 52/243; H04L 1/00; H04L 5/0073; H04J 11/005
See application file for complete search history.

(56) References Cited

U.S. PATENT DOCUMENTS

| | | | | |
|---|---|---|---|---|
| 2012/0331478 | A1* | 12/2012 | Zhu | H04W 72/0486 718/104 |
| 2013/0051239 | A1* | 2/2013 | Meredith | H04W 16/18 370/241 |
| 2013/0059583 | A1* | 3/2013 | Van Phan | H04W 72/04 455/435.1 |
| 2014/0036851 | A1* | 2/2014 | Seo | H04J 11/005 370/329 |
| 2015/0055517 | A1* | 2/2015 | Sanndanis | H04L 5/14 370/280 |
| 2016/0066191 | A1* | 3/2016 | Li | H04W 72/082 455/443 |

FOREIGN PATENT DOCUMENTS

| | | |
|---|---|---|
| EP | 2833661 A1 | 2/2015 |
| WO | 2012/064265 A1 | 5/2012 |

OTHER PUBLICATIONS

International Search Report and Written Opinion received for corresponding Patent Cooperation Treaty Application No. PCT/IB2014/065996, dated Aug. 13, 2015, 13 pages.
"3rd Generation Partnership Project; Technical Specification Group Radio Access Network; Evolved Universal Terrestrial Radio Access Network (E-UTRAN); X2 application protocol (X2AP) (Release 12)", 3GPP TS 36.423, V12.3.0, Sep. 2014, pp. 1-153.

* cited by examiner

NEIGHBORING CELL LOAD INFORMATION

RELATED APPLICATION

This application was originally filed as PCT Application No. PCT/IB2014/065996 filed Nov. 12, 2014.

BACKGROUND

Technical Field

The exemplary and non-limiting embodiments relate generally to wireless communications and, more particularly, to radio communications.

Brief Description of Prior Developments

Information is sometimes shared between base stations in a wireless network.

SUMMARY

The following summary is merely intended to be exemplary. The summary is not intended to limit the scope of the claims.

In accordance with one aspect, an example method comprises determining first information of a base station for resource usage of the base station in regard to an area of shared coverage with a neighboring base station; and transmitting the determined first information from the base station.

In accordance with another aspect, an example embodiment is provided in an apparatus comprising at least one processor; and at least one non-transitory memory including computer program code, the at least one memory and the computer program code configured to, with the at least one processor, cause the apparatus at least to: determine first information of the apparatus for resource usage of the apparatus with regard to an area of shared coverage with a neighboring base station; and transmit the determined first information from the apparatus.

In accordance with another aspect, an example embodiment is provided in a non-transitory program storage device readable by a machine, tangibly embodying a program of instructions executable by the machine for performing operations, the operations comprising: determining first information of a base station for resource usage of the base station in regard to an area of shared coverage with a neighboring base station; and transmitting the determined first information from the base station.

In accordance with another aspect, an example method comprises receiving first information by a base station indicating resource usage of the base station with regard to an area of shared coverage with a neighboring base station; determining, based at least partially upon the received first information, if resources of the neighboring base station are available; and when the resources of the neighboring base station are available for use by the base station.

In accordance with another aspect, an example embodiment is provided in an apparatus comprising at least one processor; and at least one non-transitory memory including computer program code, the at least one memory and the computer program code configured to, with the at least one processor, cause the apparatus at least to: receive first information by the apparatus indicating resource usage of the apparatus with regard to an area of shared coverage with a neighboring base station; determine, based at least partially upon the received first information, if resources of the neighboring base station are available for use by the apparatus.

In accordance with another aspect, an example embodiment is provided in a non-transitory program storage device readable by a machine, tangibly embodying a program of instructions executable by the machine for performing operations, the operations comprising: receiving first information by a base station indicating resource usage of a neighboring base station with regard to an area of shared coverage with the neighboring base station; determining, based at least partially upon the received first information, if resources of the neighboring base station are available for use by the base station.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

The following abbreviations that may be found in the specification and/or the drawing figures are defined as follows:

3 GPP Third Generation Partnership Program
AP Access Point
BB Baseband
DCI Downlink Control Information
DL Downlink
DMRS Demodulation Reference Signal
DS Discovery Signal
eNB/eNodeB enhanced Node B (base station according to LTE terminology)
ID Identity
LTE Long Term Evolution
NCT New Carrier Type
OFDM Orthogonal Frequency Division Multiplexing
OFDMA Orthogonal Frequency Division Multiple Access
PCell Primary Cell
PDCCH Physical Downlink Control CHannel
PDSCH Physical Downlink Shared CHannel
PLMN Public Land Mobile Network
PRB Physical Resource Block
RAN Radio Access Network
Rel Release
RNTI Radio Network Temporary Identifier
RRM Radio Resource Management
SCell Secondary Cell
SDL Supplemental DL
TB Transport Block
TD/TDD Time Division duplex
TL Threshold Level
UE User Equipment
UL Uplink
X2 X2 is an interface used to communication between eNBs Features as described herein may be used in regard to radio resource allocation based on an indication of load in an area of shared coverage with a neighbor. This may be applied to resource usage over a dense deployment of cells, such as small cells for example, and for interference coordination.

Figure 1:
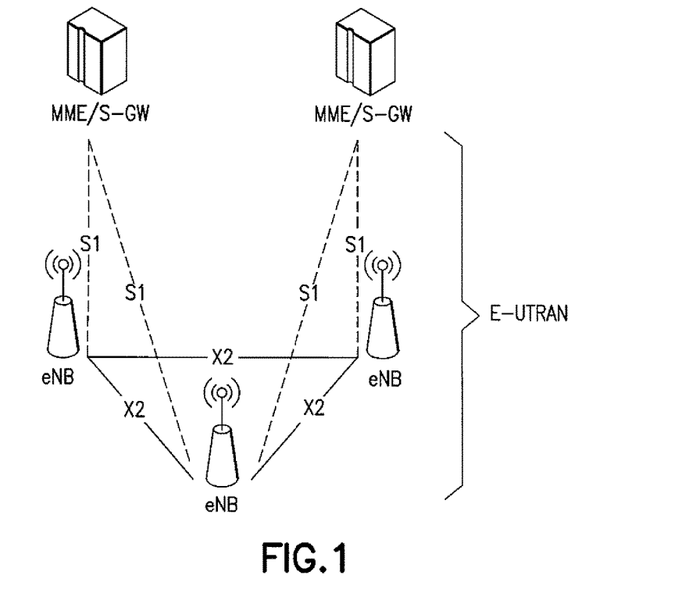
FIG. 1 is a diagram illustrating an example of an overall architecture of a E-UTRAN (evolved UMTS Terrestrial Radio Access) system.

FIG. 1 shows an example of overall architecture of an E-UTRAN system. The E-UTRAN system includes eNBs, providing an E-UTRAN user plane (PDCP/RLC/MAC/PHY) and control plane (RRC) protocol terminations towards the UE (not shown in FIG. 1). The eNBs are interconnected with each other by means of an X2 interface. The eNBs are also connected by means of a S1 interface to an EPC (Enhanced Packet Core), more specifically to a MME (Mobility Management Entity) by means of a S1 MME interface and to a Serving Gateway (S-GW) by means of a S1 interface. The S1 interface supports a many-to-many relationship between MMEs/S-GW and eNBs. It should be noted that features as described herein are not limited to use with eNB base stations, and may include use of any suitable access points or nodes, such as Wifi access points for example, functioning as a base station for the UE. Thus, the term "base station" as used herein is intended to include any suitable wireless access point.

Figure 2:
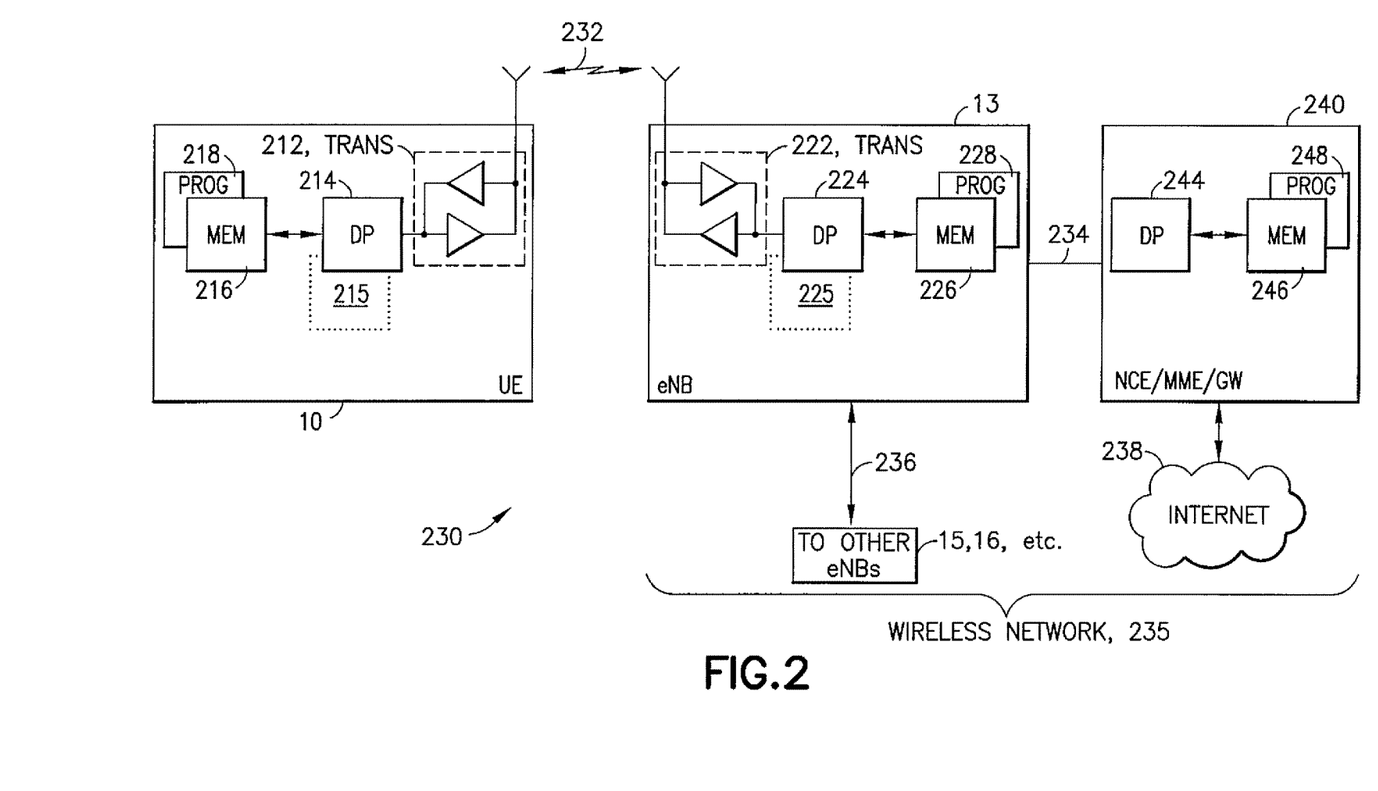
FIG. 2 is a diagram illustrating some of the components of an example.

Referring also to FIG. 2, in the wireless system 230 a wireless network 235 is adapted for communication over a wireless link 232 with an apparatus, such as a mobile communication device which may be referred to as a User Equipment (UE) 10, via a network access node, such as a Node B (base station), and more specifically an eNB 13. The network 235 may include a network control element (NCE) 240 that may include MME/S-GW functionality, and which provides connectivity with a network, such as a telephone network and/or a data communications network (e.g., the internet 238).

The UE 10 includes a controller, such as a computer or a data processor (DP) 214, a computer-readable memory medium embodied as a memory (MEM) 216 that stores a program of computer instructions (PROG) 218, and a suitable wireless interface, such as radio frequency (RF) transceiver 212, for bidirectional wireless communications with the eNB 13 via one or more antennas.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The eNB 13 also includes a controller, such as a computer or a data processor (DP) 224, a computer-readable memory medium embodied as a memory (MEM) 226 that stores a program of computer instructions (PROG) 228, and a suitable wireless interface, such as RF transceiver 222, for communication with the UE 10 via one or more antennas. The eNB 13 is coupled via a data/control path 234 to the NCE 240. The path 234 may be implemented as an interface. The eNB 13 may also be coupled to another eNB via data/control path 236, which may be implemented as an interface.

The NCE 240 includes a controller, such as a computer or a data processor (DP) 244, a computer-readable memory medium embodied as a memory (MEM) 246 that stores a program of computer instructions (PROG) 248.

At least one of the PROGs 218, 228 and 248 is assumed to include program instructions that, when executed by the associated DP, enable the device to operate in accordance with exemplary embodiments of this invention, as will be discussed below in greater detail. That is, various exemplary embodiments of this invention may be implemented at least in part by computer software executable by the DP 214 of the UE 10; by the DP 224 of the eNB 13; and/or by the DP 244 of the NCE 240, or by hardware, or by a combination of software and hardware (and firmware). Base station(s) 15, 16, etc. may have the same type of components as the base station 13.

For the purposes of describing various exemplary embodiments in accordance with this invention the UE 10 and the eNB 13 may also include dedicated processors, for example RRC module 215 and a corresponding RRC module 225. RRC module 215 and RRC module 225 may be constructed so as to operate in accordance with various exemplary embodiments in accordance with this invention.

The computer readable MEMS 216, 226 and 246 may be of any type suitable to the local technical environment and may be implemented using any suitable data storage technology, such as semiconductor based memory devices, flash memory, magnetic memory devices and systems, optical memory devices and systems, fixed memory and removable memory. The DPs 214, 224 and 244 may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., RF transceivers 212 and 222) may be of any type suitable to the local technical environment and may be implemented using any suitable communication technology such as individual transmitters, receivers, transceivers or a combination of such components.

Figure 3:
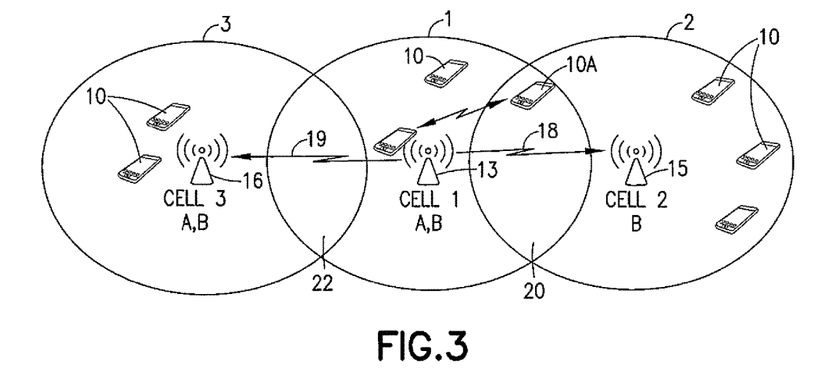
FIG. 3 is a diagram illustrating overlapping areas of coverage of cells of base stations.

Referring also to FIG. 3, an example is shown with three base stations 13, 15, 16. However, features as described herein may be used with more or less than three base stations. The first base station 13 provides a first communication cell 1 for the UEs 10. The second base station 15 provides a second cell 2. The third base station 16 provides a third cell 3. The cells 1, 2, 3 are coverage areas for their respective base stations 13, 15, 16. Thus, a UE 10 in the first cell 1 is able to communicate with the first base station 13. Likewise, a UE 10 in the second cell 2 is able to communicate with the second base station 15, and a UE 10 in the third cell 3 is able to communicate with the third base station 16. In this example cell 1 may normally operate in sub-band A and cells 2 and 3 may normally operate in sub-band B. With features as described herein, cells 2 and 3 may operate in sub-band A based upon information supplied to the base stations 15, 16 from the base station 13. In other words, base stations 15, 16 may be able to use resources that otherwise would be limited for use with base station 13.

In this example the first and second cells 1, 2 of the first and second base stations 13, 15 have an area of overlap or shared coverage 20. The area of overlap or shared coverage is, for example, a geographical area shared by two different base stations in which they can serve their users. In this example the first and third cells 1, 3 of the first and third base stations 13, 16 also have an area of overlap or shared coverage 22. As seen by UE 10A in FIG. 3, sometimes a UE is located in an area of shared coverage 20. Sometimes no UE is located in the area of shared coverage; as illustrated in the area 22 which is empty of UEs.

An example method may comprise determining first information for resource usage of a base station in regard to an area of shared coverage with a neighboring base station; and transmitting the determined first information from the base station. Determining the first information may comprise determining load of the base station in regard to the area of shared coverage with the neighboring base station. Determining the first information may comprise determining resource usage/sharing restrictions/limitations of the base station in regard to the area of shared coverage with the neighboring base station.

An example method may comprise receiving first information by a base station indicating resource usage of a neighboring base station with regard to an area of shared coverage with the neighboring base station; and determining, based at least partially upon the received first information, if resources of the neighboring base station are available for use by the base station. The first information may comprise information regarding load of the neighboring base station in regard to the area of shared coverage. The first information may comprise information regarding resource usage/sharing restrictions/limitations of the neighboring base station in regard to the area of shared coverage. When resources are determined to be available, determining if the available resources are: available with restrictions or limitations, or available without restrictions or limitations.

Figure 4:
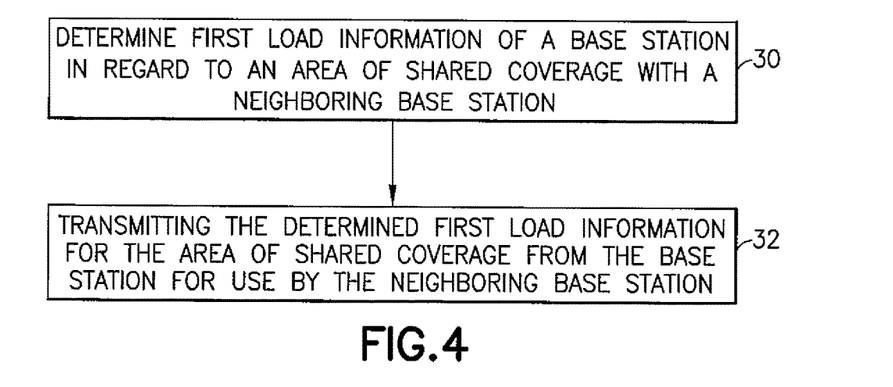
FIG. 4 is a diagram illustrating an example method.

Referring also to FIG. 4, an example of a method used by the base station 13 may comprise determining first load information of the base station 13 in regard to the area of shared coverage 20 with the neighboring base station 15 as indicated by block 30, where the first load information is only in regard to the area of shared coverage 20; and transmitting the determined first load information 18 for the area of shared coverage 20 from the base station 13, as indicated by block 32, for use by the neighboring base station 15. Likewise, the base station 13 may determine second load information of the base station 13 in regard to an area of shared coverage 22 with the neighboring base station 16, where the second load information is only in regard to the area of shared coverage 22; and transmit the determined second load information 19 for the area of shared coverage 22 from the base station 13 for use by the neighboring base station 16. Additionally, or alternatively, the base station 13 could, based on the load information, directly send the resource usage restriction/limitations to the neighboring base stations 15 and 16. These restrictions/limitations are specifically derived/identified by the base station 13 for the base stations 15 and 16 based on the load present in their respective region of shared coverage areas 20 and 22. The second load information may have the same format as the first load information. The only difference between the first and second load informations is that those may have different values considering different shared coverage area with different neighboring base stations/cells. In an alternate embodiment the formats could be different, and the values could be the same if the UE situation or resource usage is the same in both shared coverage areas. The first load information is not sent by the base station 13 to the third base station 16, and the second load information is not sent by the base station 13 to the second base station 15. Each one of the load informations 18, 19 transmitted by the base station 13 is individually tailored to a respective individual neighboring base station in regard to the shared, overlapping coverage areas; 20 and 22 for example. Each one of the load informations may be different from each other. For example, in the embodiment shown in FIG. 3, the first load information from the base station 13 for area 20 would include information 18 relative to the UE 10A in the area 20. UE 10A is in communication with the first base station 13 and, thus, uses resources. However, the second load information 19 from the base station 13 for area 22 would indicate a "no load" situation because the first base station 13 is not using resources in the second area 22. The signals 18, 19 having the load information may be transmitted indirectly between the base stations through other components of the network.

When the neighboring base stations 15, 16 receive the respective, individually scripted load informations from the first base station 13, the neighboring base stations 15, 16 may then use that information to determine how to use resources. For example, the neighboring base stations 15, 16 may then use that information to determine how to use resources for UEs that are in, or move into, the areas 20, 22 so as not to have conflicts relative to the first base station 13. Base stations 15 and 16 could use the available resources with or without restrictions/limitations or coordination for any of their UEs present anywhere in cell 2 and 3, respectively. Likewise, the second base station 15 and the third base station 16 may use the same method described above relative to their respective neighboring base stations (not shown); including the first base station 13.

Features as described herein may be used for radio resource allocation for a base station based, at least partially, on an indication of a load in an area of shared or overlapping coverage by a neighboring base station. This may be used to optimize resource usage over a dense deployment of cells, such as small cells for example, and for interference coordination.

Features as described herein may be used such that a base station evaluates load information, and then shares that information with a neighboring base station. The load information may take into account determination of location(s) of UE(s)/resources, and determination of the number of UE(s)/resources used within the shared coverage of that specific neighbor. Depending on this information, each neighboring base station could use resources in the cell of the base station which sent the load information, or be aware of restrictions/coordination needed for resource sharing in the cell of the base station which sent the load information. With this method a base station might have a different load information or load indication for each different neighboring base station at a same time.

In the simplest form, the load information could be a single bit indication, such as a bit indicating a Boolean operator for example. Alternatively, the signaling could be a number of bits to incorporate more information. For example, neighbor specific signaling aspects could include:

- Signaling whether the eNB is serving UEs in the overlapping coverage area,
- Signaling the number of UEs in the overlapping coverage area,
- Signaling the number/proportion of Physical Resource Blocks (PRBs) that are being used for serving the UEs in the overlapping coverage area,
- Neighbor eNB initiating/stopping interference coordination in response to the signaling,
- Neighbor eNB adjusting its downlink (DL) resource use or power allocation based on this signaling,
- Signaling a proportion of resources that could be used/shared, and
- Signaling that a spectrum information may be necessary when at least two different operators want to use the method when the at least two different operators do not know at least one frequency operating on.

With features as described herein, a base station may evaluate load information in regard to an area of shared coverage, such as 20 and 22 for example, and share that respective load information with the respective neighboring base station 15, 16. The load information may take into account UE location and the number of UEs/resources used, but only in regard to the area of shared coverage of that specific neighbor. Depending on this information, each neighboring base station could then determine how best to proceed to optimize resource usage in the area of overlapping coverage and provide interference coordination. In addition to this, the resource usage by the neighboring (borrowing) cell does not need to be limited only to the shared coverage region. For example, Cell 3 may use the subband A for its UEs (10) without any restrictions after receiving load information 19 from Cell 1. In case a user in Cell 3 moves in area 22, even then no restriction is applied by Cell 1 to Cell 3 for using subband A. However, Cell 3 may exploit reporting from the UE for choosing the best resources from subband A. In case when a UE connected to Cell 1 moves into the area 22, then some restriction by the Cell 1 (donor) may be applied to the Cell 3 (borrower).

In the example shown in FIGS. 3-4, when determining the load information 18 to send to the neighboring base station 15, the first base station 13 can filter out some unnecessary load information from its overall load information for the entire cell 1. For example, the first base station 13 can filter out load information for the first base station 13 outside the area of overlapping coverage 20 from the overall load information of cell 1 to determine the load information 18. This filtering of load information to create the new individually scripted load information 18 for the area 20 can, thus, reduce the signaling overhead regarding the load information 18 supplied to the neighboring base station 15 by the first base station 13.

Filtering unnecessary information is beneficial of course. However, features as described herein are able to provide information that has not otherwise been available in the past. A conventional X2 signaling contains information about the total load for a base station, such as for the entire cell 1 for the base station 13 shown in FIG. 3. However, with the conventional X2 signaling the receiving base station does not know which part of that total cell load information is for UEs in the area of overlapping coverage. Based on the conventional overall load information, the base station cannot make as accurate scheduling decisions (to avoid interference) as with the overlapping coverage area specific signaling as described herein. For a currently predominant macro cellular network, the present X2 specification works fairly well; as there is not much overlap between the cells. However, with deployment of more and more cells, such as small cells for example, there will be increasing areas of overlapping coverage and, thus, a greater need for more accurate scheduling decisions to avoid interference. The proposed method for resources usage or interference avoidance may be initiated upon a request of a neighbor who wants to use the resources of another base station, or even in the case if there are no such requests by the neighbor and each cell sends the information to the neighboring cells in regard to their respective area of shared coverage to make use of the proposed method.

Features as described herein may be used in addition to, or as an alternative to, load indication described in TS36.423 v9.6.0 at section 8.3.1 where an eNB initiates the procedure by sending LOAD INFORMATION message to eNBs controlling intra-frequency neighboring cells. If the UL Interference Overload Indication IE is received in the LOAD INFORMATION message, it indicates the interference level experienced by the indicated cell on all resource blocks, per PRB. The receiving eNB may take such information into account when setting its scheduling policy and shall consider the received UL Interference Overload Indication IE value valid until reception of a new LOAD INFORMATION message carrying an update of the same IE. If the DL High Interference Indication IE is received in the LOAD INFORMATION message, it indicates, per PRB, the occurrence of high interference sensitivity, as seen from the sending eNB. The receiving eNB should try to avoid scheduling cell edge UEs in its cells for the concerned PRBs. The Target Cell ID IE received within the UL High Interference Information IE group in the LOAD INFORMATION message indicates the cell for which the corresponding UL High Interference Indication is meant. The receiving eNB shall consider the value of the UL High Interference Information IE group valid until reception of a new LOAD INFORMATION message carrying an update.

It should be noted, however, that these indications in TS36.423 v9.6.0 are for uplink (UL). If something similar is also used for downlink (DL), it would only indicate there is interference on certain PRBs, but not whether the UEs in a shared coverage are affected and how much they are affected. In other words, it would still not indicate how much the receiving eNB can affect the interference. Features as described herein, on the other hand, exchange load information that is limited to a shared coverage area, and thereby indicate how much the receiving eNB can affect the interference.

Features as described herein may provide load information which is specific or customized for a neighbor. In TS36.423, on the other hand, the load information is in a general perspective and not tailored for a specific neighbor.

Features as described herein may provide load information which may be different for each neighbor. In TS36.423, on the other hand, a cell indicates in general same load information to every neighbor, such as indicating that it is having high interference on specific PRBs.

Features as described herein allow for different neighbors to react in a different way. In TS36.423, on the other hand, neighbors are expected to exhibit in general a similar behavior.

Features as described herein may provide a method which takes into account the UE location to determine the presence of UEs and the amount of traffic used only in the shared coverage region. Thus, if for one neighbor there are no users in the shared coverage, the base station may indicate a "no load" condition. This may be in contrast to another neighbor for whom there are cell users (i.e. UEs) in their shared coverage area. Thus, a first base station and a second neighboring base station may share a band without limitations. However, the first base station and a third neighboring base station may share a band with some limitations.

In a "no load" condition, measurement reporting for certain neighbors and bands might be completely stopped. Also, the signaling between those neighbors may be completely stopped until UEs/resources enter into the area of shared coverage.

Features as described herein are not limited to intra-frequency such as in TS36.423.

With features as described herein, the load information does not need to be based on per PRBs. For example, in a case where there are no users in an area of shared coverage, the load information may be simply a Boolean indication. In addition, the information could be extended to a percentage of PRBs, or number of UEs, or number of PRBs, etc.

As noted above, an example method may comprise determining first load information of a base station in regard to an area of shared coverage with a neighboring base station, where the first load information is only in regard to the area of shared coverage; and transmitting the determined first load information for the area of shared coverage from the base station for use by the neighboring base station.

Determining the first load information may comprise determining a number of user equipment and/or resources, which the base station is in communication with, in the area of shared coverage. The method may further comprise determining a second load information of the base station in regard to a second area of shared coverage with a second different neighboring base station, where the second load information is only in regard to the second area of shared coverage; and transmitting the determined second load information for the second area of shared coverage from the base station for use by the second neighboring base station. When the determined first load information is a no load condition, the method may comprise allowing the neighboring base station to use resource(s) of a cell of the base station substantially without restriction/limitation. The use of the resource(s) by the neighboring base station is not restricted only to the shared coverage. The method may further comprise receiving neighboring load information by the base station with regard to the area of shared coverage with the neighboring base station; determining, based at least partially upon the received neighboring load information, if resources of the neighboring base station are available for use by the base station; and when resources of the neighboring base station are available for use by the base station in the area of shared coverage: determining if a restriction for resource sharing of the base station with the neighboring base station are present, and/or determining if coordination is needed for resource sharing of the base station with the neighboring base station. When only the neighboring cell is interested in using the resources of the serving cell, it is not necessary that the serving base station receive the load information of the neighboring cell. However, if both the cells are interested in using each others' resources, they both can send information to each other. And, in this case as well, information from the two cells for the same shared coverage region might be different. For example, the information might be different if one cell has users in the shared coverage and other cell does not have users in the shared coverage, or if both the cells have respectively different amounts of resource usage in their shared coverage area.

The serving base station, such as eNB, may determine load information based on UE location and the number of UEs/resources used within the shared coverage of a specific neighbor. Depending on this information each neighbor could either use the resources of another neighboring cell or be aware of restrictions/coordination needed for resource sharing.

When the determined neighboring load information is a no load condition, the method may comprise allowing the base station to use the resource of the neighboring base station in the area of shared coverage substantially without restriction/limitation. Also, as noted above, in addition the resource usage by the borrowing cell might not be limited only to the shared coverage region. Transmitting the determined first load information may comprise transmitting only a single bit. Transmitting the determined first load information may comprise at least one of: signaling whether the base station is serving user equipment (UE) in the area of shared coverage, signaling a number of user equipment (UE) the base station is serving in the area of shared coverage, signaling a number or proportion of Physical Resource Block(s) (PRBs) that are being used for serving the user equipment (UE) in the area of shared coverage, indicating to the neighboring base station to initiate or stop interference coordination, and indicating to the neighboring base station to adjusting its Downlink (DL) resource use and/or power allocation based, signaling a proportion of resources that could be used/shared, and signaling that a spectrum information may be necessary when at least two different operators want to use the method when the at least two different operators do not know at least one frequency operating on.

An example embodiment may be provided in an apparatus comprising at least one processor; and at least one non-transitory memory including computer program code, the at least one memory and the computer program code configured to, with the at least one processor, cause the apparatus at least to: determine first load information of the apparatus with regard to an area of shared coverage with a neighboring base station, where the first load information is only in regard to the area of shared coverage; and transmit the determined first load information for the area of shared coverage from the apparatus for use by the neighboring base station.

The at least one processor and the computer program code in the at least one memory may be configured to cause the apparatus to determine a number of user equipment and/or resources, which the apparatus is in communication with, in the area of shared coverage in order to determine the first load information. The at least one processor and the computer program code in the at least one memory may be configured to cause the apparatus to: determine a second load information of the apparatus in regard to a second area of shared coverage with a second different neighboring base station, where the second load information is only in regard to the second area of shared coverage; and transmit the determined second load information for the second area of shared coverage from the apparatus for use by the second neighboring base station. The at least one processor and the computer program code in the at least one memory may be configured to cause the apparatus to: when the determined first load information is a no load condition, allow the neighboring base station to use resources of the apparatus in the area of shared coverage substantially without restriction/ limitation. Also, as noted above, in addition the resource usage by the borrowing cell might not be limited only to the shared coverage region. The at least one processor and the computer program code in the at least one memory may be configured to cause the apparatus to: receive neighboring load information by the apparatus with regard to the area of shared coverage with the neighboring base station; determine, based at least partially upon the received neighboring load information, if resources are available for use by the apparatus; and when resources of the neighboring base station are available for use by the apparatus in the area of shared coverage: determine if a restriction for resource sharing of the apparatus with the neighboring base station are present, and/or determine if coordination is needed for resource sharing of the apparatus with the neighboring base station. The at least one processor and the computer program code in the at least one memory are configured to cause the apparatus to: when the determined neighboring load information is a no load condition, allow the apparatus to use the resource of the neighboring base station in the area of shared coverage substantially without restriction/limitation. Also, as noted above, in addition the resource usage by the borrowing cell might not be limited only to the shared coverage region. The at least one processor and the computer program code in the at least one memory may be configured to cause the apparatus to transmit only a single bit for the transmit of the determined first load information. The at least one processor and the computer program code in the at least one memory may be configured to cause the apparatus to transmit the determined first load information as comprises at least one of: signal whether the apparatus is serving user equipment (UE) in the area of shared coverage, signal a number of user equipment (UE) the apparatus is serving in the area of shared coverage, signal a number or proportion of Physical Resource Block(s) (PRBs) that are being used for serving the user equipment (UE) in the area of shared coverage, indicate to the neighboring base station to initiate or stop interference coordination, and indicate to the neighboring base station to adjusting its Downlink (DL) resource use and/or power allocation based.

An example embodiment may be provided in a non-transitory program storage device, such as 226 for example, readable by a machine, tangibly embodying a program of instructions executable by the machine for performing operations, the operations comprising: determining first load information of a base station in regard to an area of shared coverage with a neighboring base station, where the first load information is only in regard to the area of shared coverage; and transmitting the determined first load information for the area of shared coverage from the base station for use by the neighboring base station. Determining the first load information may comprise determining a number of user equipment and/or resources, which the base station is in communication with, in the area of shared coverage. The operations may further comprise: determining a second load information of the base station in regard to a second area of shared coverage with a second different neighboring base station, where the second load information is only in regard to the second area of shared coverage; and transmitting the determined second load information for the second area of shared coverage from the base station for use by the second neighboring base station. When the determined first load information is a no load condition, the operations may comprise allowing the neighboring base station to use the resource of the base station substantially without restriction/limitation. Also, as noted above, in addition the resource usage by the borrowing cell might not be limited only to the shared coverage region. The operations may further comprise: receiving neighboring load information by the base station with regard to the area of shared coverage with the neighboring base station; determining, based at least partially upon the received neighboring load information, if resources of the neighboring base station are available for use by the base station; and when resources of the neighboring base station are available for use by the base station in the area of shared coverage: determining if a restriction for resource sharing of the base station with the neighboring base station are present, and/or determining if coordination is needed for resource sharing of the base station with the neighboring base station. When the determined neighboring load information is a no load condition, the operations may comprise allowing the base station to use the resource of the neighboring base station substantially without restriction/limitation. Also, as noted above, in addition the resource usage by the borrowing cell might not be limited only to the shared coverage region. Transmitting the determined first load information may comprise transmitting only a single bit. Transmitting the determined first load information comprises at least one of: signaling whether the base station is serving user equipment (UE) in the area of shared coverage, signaling a number of user equipment (UE) the base station is serving in the area of shared coverage, signaling a number or proportion of Physical Resource Block(s) (PRBs) that are being used for serving the user equipment (UE) in the area of shared coverage, indicating to the neighboring base station to initiate or stop interference coordination, and indicating to the neighboring base station to adjusting its Downlink (DL) resource use and/or power allocation based.

Figure 5:
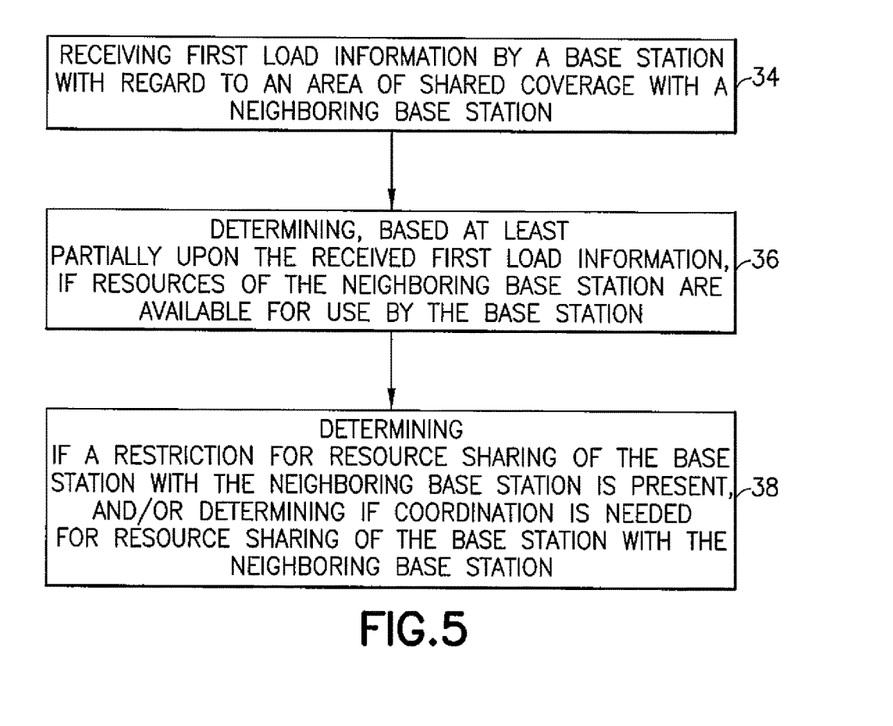
FIG. 5 is a diagram illustrating an example method.

Referring also to FIG. 5, an example method may comprise receiving first load information by a base station 15 with regard to an area of shared coverage 20 with a neighboring base station 13 as indicated by block 34, where the first load information is only in regard to the area of shared coverage 20; determining, based at least partially upon the received first load information, if resources of the neighboring base station are available for use by the base station as indicated by block 36; and when the resources of the neighboring base station are available for use by the base station in the area of shared coverage: determining if a restriction for resource sharing of the base station with the neighboring base station is present, and/or determining if coordination is needed for resource sharing of the base station with the neighboring base station as indicated by block 38.

Determining if the resources of the neighboring base station are available for use by the base station may comprise the first load information comprising information regarding a number of user equipment and/or resources, which the neighboring base station is in communication with, in the area of shared coverage. The method may further comprise determining a second load information of the base station in regard to a second area of shared coverage with a second different neighboring base station, where the second load information is only in regard to the second area of shared coverage; and transmitting the determined second load information for the second area of shared coverage from the base station for use by the second neighboring base station. When the first load information is a no load condition, the method may comprise allowing the base station to use the resources of the neighboring base station substantially without restriction/limitation. Also, as noted above, in addition the resource usage by the borrowing cell might not be limited only to the shared coverage region. The first load information may comprise only a single bit. The first load information may comprise at least one of: indicating whether the neighboring base station is serving user equipment (UE) in the area of shared coverage, indicating a number of user equipment (UE) the neighboring base station is serving in the area of shared coverage, indicating a number or proportion of Physical Resource Block(s) (PRBs) that are being used for serving the user equipment (UE) by the neighboring base station in the area of shared coverage, indicating to neighboring base station to initiate or stop interference coordination, and indicating to the base station to adjusting its Downlink (DL) resource use and/or power allocation based.

An example embodiment may be provided in an apparatus comprising at least one processor; and at least one non-transitory memory including computer program code, the at least one memory and the computer program code configured to, with the at least one processor, cause the apparatus at least to: receive first load information by the apparatus with regard to an area of shared coverage with a neighboring base station, where the first load information is only in regard to the area of shared coverage; determine, based at least partially upon the received first load information, if resources of the neighboring base station are available for use by the apparatus; and when resources of the neighboring base station are available for use by the apparatus in the area of shared coverage: determine if a restriction for resource sharing of the apparatus with the neighboring base station are present, and/or determine if coordination is needed for resource sharing of the apparatus with the neighboring base station.

The at least one processor and the computer program code in the at least one memory may be configured to determine if the resources of the neighboring base station are available for use by the base station comprises the first load information using information regarding a number of user equipment and/or resources, which the neighboring base station is in communication with, in the area of shared coverage. The at least one processor and the computer program code in the at least one memory may be configured to: determine a second load information of the base station in regard to a second area of shared coverage with a second different neighboring base station, where the second load information is only in regard to the second area of shared coverage; and transmit the determined second load information for the second area of shared coverage from the base station for use by the second neighboring base station. The at least one processor and the computer program code in the at least one memory may be configured to: when the first load information is a no load condition, allow the base station to use the resources of the neighboring base station in the area of shared coverage substantially without restriction/limitation. Also, as noted above, in addition the resource usage by the borrowing cell might not be limited only to the shared coverage region. The at least one processor and the computer program code in the at least one memory may be configured to determine if the resources of the neighboring base station are available for use by the apparatus when the first load information comprising only a single bit. The at least one processor and the computer program code in the at least one memory may be configured to determine if the resources of the neighboring base station are available for use by the apparatus when the first load information comprises at least one of: indicating whether the neighboring base station is serving user equipment (UE) in the area of shared coverage, indicating a number of user equipment (UE) the neighboring base station is serving in the area of shared coverage, indicating a number or proportion of Physical Resource Block(s) (PRBs) that are being used for serving the user equipment (UE) by the neighboring base station in the area of shared coverage, indicating to neighboring base station to initiate or stop interference coordination, and indicating to the base station to adjusting its Downlink (DL) resource use and/or power allocation based.

An example embodiment may be provided in a non-transitory program storage device readable by a machine, tangibly embodying a program of instructions executable by the machine for performing operations, the operations comprising: receiving first load information by a base station with regard to an area of shared coverage with a neighboring base station, where the first load information is only in regard to the area of shared coverage; determining, based at least partially upon the received first load information, if resources of the neighboring base station are available for use by the base station; and when resources of the neighboring base station are available for use by the base station in the area of shared coverage: determining if a restriction for resource sharing of the base station with the neighboring base station are present, and/or determining if coordination is needed for resource sharing of the base station with the neighboring base station.

Determining if the resources of the neighboring base station are available for use by the base station may comprise the first load information comprising information regarding a number of user equipment and/or resources, which the neighboring base station is in communication with, in the area of shared coverage. The operations may further comprise: determining a second load information of the base station in regard to a second area of shared coverage with a second different neighboring base station, where the second load information is only in regard to the second area of shared coverage; and transmitting the determined second load information for the second area of shared coverage from the base station for use by the second neighboring base station. When the first load information is a no load condition, the operations may comprise allowing the base station to use the resources of the neighboring base station substantially without restriction/limitation. Also, as noted above, in addition the resource usage by the borrowing cell might not be limited only to the shared coverage region. The first load information may comprise only a single bit. The first load information may comprise at least one of: indicating whether the neighboring base station is serving user equipment (UE) in the area of shared coverage, indicating a number of user equipment (UE) the neighboring base station is serving in the area of shared coverage, indicating a number or proportion of Physical Resource Block(s) (PRBs) that are being used for serving the user equipment (UE) by the neighboring base station in the area of shared coverage, indicating to neighboring base station to initiate or stop interference coordination, and indicating to the base station to adjusting its Downlink (DL) resource use and/or power allocation based.

An example embodiment may comprises means for determining first load information of a base station in regard to an area of shared coverage with a neighboring base station, where the first load information is only in regard to the area of shared coverage; and means for transmitting the determined first load information for the area of shared coverage from the base station for use by the neighboring base station.

An example embodiment may comprises means for receiving first load information by a base station with regard to an area of shared coverage with a neighboring base station, where the first load information is only in regard to the area of shared coverage; means for determining, based at least partially upon the received first load information, if resources of the neighboring base station are available for use by the base station; and when the resources of the neighboring base station are available for use by the base station in the area of shared coverage: means for determining if a restriction for resource sharing of the base station with the neighboring base station is present, and/or means for determining if coordination is needed for resource sharing of the base station with the neighboring base station.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example method may comprise determining first information of a base station for load and/or resource usage/sharing restrictions/limitations of the base station in regard to an area of shared coverage with a neighboring base station, where the area of shared coverage is not an entire area of coverage of the base station; and transmitting the determined first information from the base station, where the first information is configured to be used by the neighboring base station. The area of shared coverage not being the entire area of coverage of the base station may not be correct in all the cases. For example, in a very dense network two different cells from different operators might be completely overlapped if in case different operators wants to use the proposed method. Or, in a case where two cells have different transmit powers and different size, one cell might be completely lying within another bigger cell.

An example embodiment may be provided in an apparatus comprising at least one processor; and at least one non-transitory memory including computer program code, the at least one memory and the computer program code configured to, with the at least one processor, cause the apparatus at least to: determine first information of the apparatus for load and/or resource usage/sharing restrictions/limitations of the base station with regard to an area of shared coverage with a neighboring base station, where the area of shared coverage is not an entire area of coverage of the apparatus; and transmit the determined first information from the apparatus, where the first information is configured to be used by the neighboring base station.

An example embodiment may be provided in a non-transitory program storage device readable by a machine, tangibly embodying a program of instructions executable by the machine for performing operations, the operations comprising: determining first information of a base station for load and/or resource usage/sharing restrictions/limitations of the base station in regard to an area of shared coverage with a neighboring base station, where the area of shared coverage is not an entire area of coverage of the base station; and transmitting the determined first information from the base station, where the first information is configured to be used by the neighboring base station.

An example method may comprise receiving first information by a base station for load and/or resource usage/sharing restrictions/limitations of a neighboring base station with regard to an area of shared coverage with the neighboring base station, where the area of shared coverage is not an entire area of coverage of the neighboring base station; determining, based at least partially upon the received first information, if resources of the neighboring base station are available for use by the base station; and when the resources of the neighboring base station are available for use by the base station: determining if a restriction for resource sharing of the base station with the neighboring base station is present, and/or determining if coordination is needed for resource sharing of the base station with the neighboring base station.

An example embodiment may be provided in an apparatus comprising at least one processor; and at least one non-transitory memory including computer program code, the at least one memory and the computer program code configured to, with the at least one processor, cause the apparatus at least to: receive first information by the apparatus for load and/or resource usage/sharing restrictions/limitations of a neighboring base station with regard to an area of shared coverage with the neighboring base station, where the area of shared coverage is not an entire area of coverage of the neighboring base station; determine, based at least partially upon the received first information, if resources of the neighboring base station are available for use by the apparatus; and when resources of the neighboring base station are available for use by the apparatus: determine if a restriction for resource sharing of the apparatus with the neighboring base station are present, and/or determine if coordination is needed for resource sharing of the apparatus with the neighboring base station.

An example embodiment may be provided in a non-transitory program storage device readable by a machine, tangibly embodying a program of instructions executable by the machine for performing operations, the operations comprising: receiving first information by a base station for load and/or resource usage/sharing restrictions/limitations of a neighboring base station with regard to an area of shared coverage with the neighboring base station, where the area of shared coverage is not an entire area of coverage of the base station; determining, based at least partially upon the received first information, if resources of the neighboring base station are available for use by the base station; and when resources of the neighboring base station are available for use by the base station: determining if a restriction for resource sharing of the base station with the neighboring base station are present, and/or determining if coordination is needed for resource sharing of the base station with the neighboring base station.

In one example embodiment the load and/or resource restriction/limitation information sent by a base station to a neighboring base station may comprise first information regarding the load and/or resource restriction/limitation of the base station in the area of shared coverage as a first component and other information regarding the load and/or resource restriction/limitation information of the base station in an area outside the area of shared coverage (or including the area of shared coverage) as one or more second components.

An example apparatus may comprise at least one processor; and at least one non-transitory memory including computer program code, the at least one memory and the computer program code configured to, with the at least one processor, cause the apparatus at least to: determine first information of the apparatus for resource usage with regard to an area of shared coverage with a neighboring base station; and transmit the determined first information from the apparatus. Determining the first information may comprise determining load of the base station in regard to the area of shared coverage with the neighboring base station. Determining the first information may comprise determining resource usage/sharing restrictions/limitations of the base station in regard to the area of shared coverage with the neighboring base station.

An example apparatus may be provided in non-transitory program storage device readable by a machine, tangibly embodying a program of instructions executable by the machine for performing operations, the operations comprising: determining first information of a base station for resource usage of the base station in regard to an area of shared coverage with a neighboring base station; and transmitting the determined first information from the base station. The method may also include determining resource usage/sharing restrictions/limitations of the neighboring base station in regard to the area of shared coverage with the base station.

An example apparatus may comprise at least one processor; and at least one non-transitory memory including computer program code, the at least one memory and the computer program code configured to, with the at least one processor, cause the apparatus at least to: receive first information by the apparatus indicating resource usage of the apparatus with regard to an area of shared coverage with a neighboring base station; and determine, based at least partially upon the received first information, if resources of the neighboring base station are available for use by the apparatus. The at least one processor and the computer program code in the at least one memory may be configured to, when resources are determined to be available, determine if the available resources are: available with restrictions or limitations, or available without restrictions or limitations.

An example embodiment may be provided in a non-transitory program storage device readable by a machine, tangibly embodying a program of instructions executable by the machine for performing operations, the operations comprising: receiving first information by a base station indicating resource usage of a neighboring base station with regard to an area of shared coverage with the neighboring base station; and determining, based at least partially upon the received first information, if resources of the neighboring base station are available for use by the base station.

Features as described herein may comprise a method which may be started automatically by the serving base station 13 or, alternatively, based upon on a request signal of the neighboring base station 15 or 16 who wants to use the resources of serving base station 13.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising: determining first information for resource usage of a base station in regard to an area of shared coverage with a neighboring base station; and transmitting the determined first information from the base station; determine a second information of the base station for resource usage of the base station in regard to a second area of shared coverage with a second different neighboring base station; and transmit the determined second information from the base station;
wherein the second information is different from the first information, and where the first information and the second information are available from the base station at a same time and transmitted from the base station.

2. The method of claim 1, wherein determining the first information comprises one of: determining load of the base station in regard to the area of shared coverage with the neighboring base station; determining resource usage, sharing restrictions or limitations of the base station in regard to the area of shared coverage with the neighboring base station; and determining a number of user equipment which the base station is in communication with in the area of shared coverage.

3. The method of claim 2, further comprising determining resource usage, sharing restrictions or limitations of the neighboring base station in regard to the area of shared coverage with the base station.

4. An apparatus comprising: at least one processor; and at least one non-transitory memory including computer program code, the at least one memory and the computer program code configured to, with the at least one processor, cause the apparatus at least to: determine first information of the apparatus for resource usage with regard to an area of shared coverage with a neighboring base station; and transmit the determined first information from the apparatus; determine a second information of the apparatus for resource usage of the apparatus in regard to a second area of shared coverage with a second different neighboring base station; and transmit the determined second information from the apparatus;
wherein the second information is different from the first information, and where the first information and the second information are available from the apparatus at a same time and transmitted from the apparatus.

5. The apparatus of claim 4, wherein the at least one processor and the computer program code in the at least one memory are configured to cause the apparatus to determine the first information by determining load of the apparatus in regard to the area of shared coverage with the neighboring base station.

6. The apparatus of claim 4, wherein the at least one processor and the computer program code in the at least one memory are configured to cause the apparatus to determine the first information by determining resource usage, sharing restrictions or limitations of the base station in regard to the area of shared coverage with the neighboring base station.

7. The apparatus of claim 4, wherein the at least one processor and the computer program code in the at least one memory are configured to cause the apparatus to determine a number of user equipment which the apparatus is in communication with in the area of shared coverage in order to determine the first information.

8. The apparatus of claim 4, wherein the at least one processor and the computer program code in the at least one memory are configured to cause the apparatus to: when the determined first information is a no load condition, allow the neighboring base station to use at least one resource of the apparatus substantially without restriction or limitation.

9. The apparatus of claim 4, wherein the at least one processor and the computer program code in the at least one memory are configured to cause the apparatus to, when the determined first information has a load condition:
determine if a restriction for resource sharing of the apparatus with the neighboring base station is present, and/or
determine if coordination is needed for resource sharing of the apparatus with the neighboring base station.

10. The apparatus of claim 4, wherein the at least one processor and the computer program code in the at least one memory are configured to cause the apparatus to transmit only a single bit for the transmission of the determined first information.

11. The apparatus of claim 4, wherein the at least one processor and the computer program code in the at least one memory are configured to cause the apparatus to transmit the determined first information comprises at least one of: signal whether the apparatus is serving user equipment in the area of shared coverage, signal a number of user equipment the apparatus is serving in the area of shared coverage, signal a number or proportion of physical resource blocks that are being used for serving user equipment in the area of shared coverage, indicate to the neighboring base station to initiate or stop interference coordination, indicate to the neighboring base station to adjust its downlink resource use and/or power allocation based on at least one of the signalings, signal a proportion of resources that could be used or shared, and signal that a spectrum information may be necessary for at least two different operators when the at least two different operators do not know at least one frequency operated on.

12. An apparatus comprising: at least one processor; and at least one non-transitory memory including computer program code, the at least one memory and the computer program code configured to, with the at least one processor, cause the apparatus at least to: receive first information by the apparatus indicating resource usage of a neighboring base station with regard to an area of shared coverage with the neighboring base station; determine, based at least partially upon the received first information, if resources of the neighboring base station are available for use by the apparatus;

receive a second information by the apparatus for resource usage of the neighboring base station in regard to a second area of shared coverage with a second different neighboring base station;

wherein the second information is different from the first information, and where the first information and the second information are available from the apparatus at a same time and transmitted from the apparatus.

13. The apparatus of claim 12, wherein the at least one processor and the computer program code in the at least one memory are configured to, when resources are determined to be available, determine if the available resources are:

available with restrictions or limitations, or available without restrictions or limitations.

14. The apparatus of claim 12, wherein the at least one processor and the computer program code in the at least one memory are configured to determine if the resources of the neighboring base station are available for use by the apparatus comprises the first information using information regarding a number of user equipment which the neighboring base station is in communication with in the area of shared coverage.

15. The apparatus of claim 12, wherein the at least one processor and the computer program code in the at least one memory are configured to: when the first information is a no load condition, allow the apparatus to use at least one of the resources of a cell of the neighboring base station substantially without restriction or limitation.

16. The apparatus of claim 12, wherein the at least one processor and the computer program code in the at least one memory are configured to determine if the resources of the neighboring base station are available for use by the apparatus when the first information comprising only a single bit.

17. The apparatus of claim 12, wherein the first information comprises at least one of: an indication whether the neighboring base station is serving user equipment in the area of shared coverage; a number of user equipment the neighboring base station is serving in the area of shared coverage; a number or proportion of physical resource blocks that are being used for serving user equipment by the neighboring base station in the area of shared coverage; an indication to the neighboring base station to initiate or stop interference coordination; an indication to the apparatus to adjust its downlink resource use and/or power allocation; a proportion of resources that could be used or shared; and a signal that a spectrum information may be necessary for at least two different operators when the at least two different operators do not know at least one frequency operated on.

* * * * *